United States Patent [19]

Bahel et al.

[11] Patent Number: 5,440,890
[45] Date of Patent: Aug. 15, 1995

[54] BLOCKED FAN DETECTION SYSTEM FOR HEAT PUMP

[75] Inventors: Vijay Bahel, Sidney; Hank Millet, Piqua; Mickey Hickey, Sidney; Hung Pham, Dayton; Gregory P. Herroon, Piqua, all of Ohio

[73] Assignee: Copeland Corporation, Sidney, Ohio

[21] Appl. No.: 165,725

[22] Filed: Dec. 10, 1993

[51] Int. Cl.⁶ .................. F25B 41/00; F25B 47/02; F25D 21/06; G01N 25/00

[52] U.S. Cl. ............................... 62/81; 62/156; 374/45

[58] Field of Search .............. 62/156, 129, 126, 125, 62/81; 374/45

[56] References Cited

U.S. PATENT DOCUMENTS

| | | | |
|---|---|---|---|
| 4,173,871 | 11/1979 | Brooks | 62/80 |
| 4,209,994 | 7/1980 | Mueller et al. | 62/155 |
| 4,211,089 | 7/1980 | Mueller et al. | 62/160 |
| 4,301,660 | 11/1981 | Mueller et al. | 62/126 |
| 4,381,549 | 4/1983 | Stamp, Jr. et al. | 62/126 |
| 4,407,138 | 10/1983 | Mueller | 62/126 |
| 4,574,871 | 3/1986 | Parkinson et al. | 62/129 |
| 4,750,332 | 6/1988 | Jenski et al. | 62/80 |
| 4,751,825 | 6/1988 | Voorhis et al. | 62/156 |
| 4,831,833 | 5/1989 | Duenes et al. | 62/140 |
| 4,850,204 | 7/1989 | Bos et al. | 62/234 |
| 4,882,908 | 11/1989 | White | 62/155 |
| 4,916,912 | 4/1990 | Levine et al. | 62/80 |
| 5,319,943 | 6/1994 | Bahel et al. | 62/156 |
| 5,345,775 | 9/1994 | Ridenour | 62/156 |

FOREIGN PATENT DOCUMENTS 402110270  4/1990  Japan .................... 62/129

*Primary Examiner*—Diego F. F. Gutierrez
*Attorney, Agent, or Firm*—Harness, Dickey & Pierce

[57] ABSTRACT

A blocked fan or obstructed airflow condition is detected by measuring the difference between outdoor air temperature and outdoor exchanger coil temperature. If a very high difference is detected, or if no decrease in the difference is achieved after termination of the defrost cycle, and if either of these conditions persists over a plurality of defrost cycles, then the blocked condition is declared. The diagnostic system can be integrated in an existing demand defrost cycle and is capable of detecting blocked conditions attributable to foreign matter such as leaves, paper and debris which cannot be cleared by defrosting.

12 Claims, 9 Drawing Sheets

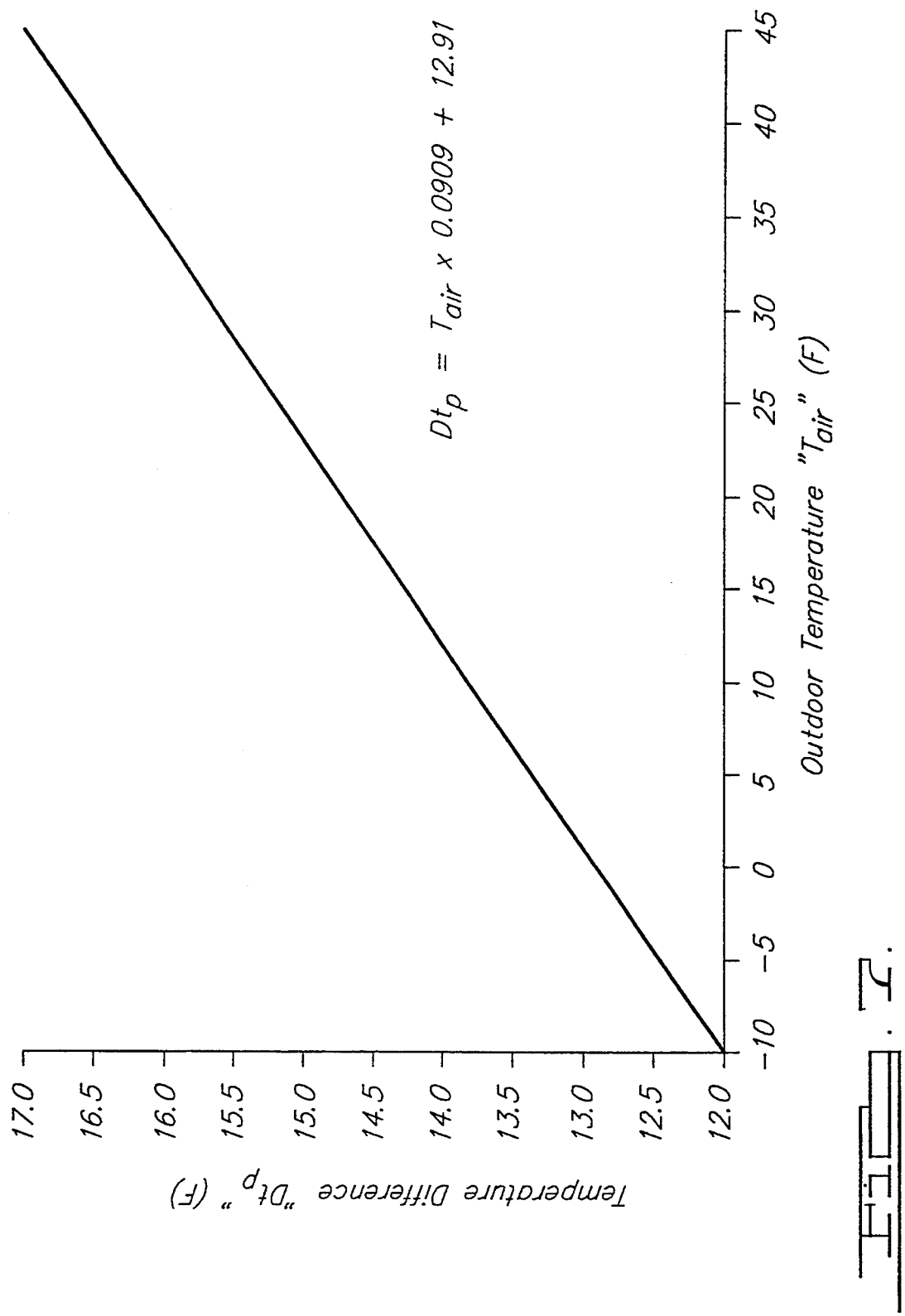

BLOCKED FAN DETECTION SYSTEM FOR HEAT PUMP

BACKGROUND AND SUMMARY OF THE INVENTION

The present invention relates generally to heat pumps and air-conditioning equipment. More particularly, the invention relates to a system for diagnosing a blocked fan condition in the outdoor heat exchanger.

Conventional air-conditioning and heat pump systems transfer energy from a low temperature air source to a high temperature air sink by pumping refrigerant through a closed circuit which includes an indoor heat exchanger or coil and an outdoor heat exchanger or coil. In the air-conditioning or cooling mode the heat pump extracts heat from the inside air and releases it into the outside air. In the heating mode the process is reversed. The heat pump extracts heat from the outside air and releases it into the living space. Thus in the cooling mode the indoor heat exchanger communicates with the low temperature air source and the outdoor heat exchanger with the high temperature sink. Conversely, in the heating mode the outdoor heat exchanger communicates with the low temperature air source and the indoor heat exchanger with the high temperature sink. In both cases, heat is transferred or pumped by vaporizing the liquid refrigerant using heat transferred from the air flowing through the heat exchanger at the low temperature source.

Efficient operation of the refrigeration cycle requires that sufficient heat be transferred from the low temperature air source through the associated heat exchanger in order to maintain adequate capacity for meeting the heat transfer demand. Most systems use fans or blowers to force air through the heat exchangers to transfer heat to the various rooms of the building via the circulating air.

Ideally, to achieve; optimal system performance, both heat exchangers should be kept free of frost and other foreign matter and the associated fans or blowers and associated air ducts should be kept free of blockage as well. When the outdoor heat exchanger coil takes on an accumulation of frost, or when the airflow passageways or fan become blocked with foreign matter, system performance deteriorates.

Most conventional heat pumps have some mechanism for addressing the frost accumulation problem of the outdoor coil. Typically this is done by reversing the normal cycle, switching from heating mode to cooling mode, for a sufficient time to melt any accumulated frost. In this reverse cycle defrost process, high temperature refrigerant from the discharge of the compressor is redirected to the frosted coil to thereby raise the coil temperature and melt the frost. Unfortunately, such reverse cycle processing decreases system efficiency, since the reverse cycle process causes the system to temporarily act as an air conditioner during the winter and as a heater during the summer. This loss of efficiency is further exacerbated in the case of the heat pump in heating mode. Many heat pump systems rely on auxiliary electric resistance heaters to supplement the heat provided by the heat pump. During the defrost cycle, when the heat pump is acting as an air conditioner, it is often necessary to use the auxiliary electric; resistance heaters to offset the cooling caused by the defrost cycle. This further reduces system efficiency.

During the heating operation of the heat pump frost accumulation on the evaporator coil is a common occurrence and the efficiency-degrading defrost cycle is a necessary evil. However, frost accumulation i! s only one cause of performance degradation. Obstructions in ! the airflow passages and blockage or partial blockage of the evaporator (outdoor) fan will also degrade system performance. Unfortunately, blockage by foreign matter, such as dust and dirt, leaves, paper and the like cannot be cleared by melting in a defrost cycle. To make matters worse, obstruction of airflow passages or blockage of the outdoor fan will often simulate frost accumulation conditions, invoking unnecessary (and ineffective) defrost cycles. For example, a demand defrost system which relies on sensing air pressure drop across the heat exchanger coil in order to sense the presence of frost accumulation, would be unable to distinguish frost accumulation from foreign matter debris accumulation. Such a system would respond by repeatedly invoking efficiency degrading defrost cycles to no avail.

The problem of airflow passageway obstruction and fan blockage has not heretofore been adequately dealt with. Because outdoor heat exchangers tend to be hidden among foliage in many residential settings, fan and airway blockage is a common problem which often goes undetected.

The present invention addresses the airflow and fan blockage problem by providing a blockage detection system which may be implemented in conjunction with a frost detection system, without requiring expensive modifications or additional sensors. The system of the invention is capable of detecting a fan blockage condition from frost or airway restriction condition due to foreign matter or debris. Thus the system will not repeatedly invoke unnecessary defrost cycles which are incapable of clearing the obstruction. Furthermore, this diagnostic is expected to save energy.

In accordance with one aspect of the invention a blocked fan detection method is provided for detecting an airflow obstruction condition in a heart exchanger. The method comprises determining a temperature difference parameter indicative of the temperature difference between the heat exchanger and the ambient air surrounding the heat exchanger. A defrost cycle is performed when the temperature difference parameter exceeds a predetermined value. After the defrost cycle has completed the temperature difference parameter is checked during a second cycle to validate the diagnosis. A blocked fan or airflow obstruction condition is declared if the second determined temperature difference parameter exceeds a predetermined value.

The airflow obstruction or blocked fan detection system of the invention may be readily integrated with the existing demand defrost logic. In this way, a blocked fan or obstructed airflow condition can be detected as an adjunct to the normal defrost cycle. This allows the system to override or prevent efficiency-degrading defrost operations when the results of which would be of minimal value due to foreign matter blockage. The detection system of the invention can be readily and economically implemented without the need for special sensors. The system works using simple temperature measurements from sensors which are, in most cases, already provided in the heat pump system or which may be inexpensively added.

For a more complete understanding of the invention, its objects and advantages, reference may be had to the

BRIEF DESCRIPTION OF THE DRAWINGS

FIG. 6A-6C collectively comprise a more detailed flowchart of the blockage detection mechanism of the presently preferred embodiment;

FIG. 7 is a graph depicting the relationship between outdoor air temperature and outdoor coil temperature used for the defrost cycle initiation.

DESCRIPTION OF THE PREFERRED EMBODIMENT

The present invention provides an apparatus and method for detecting an airflow obstruction or blocked fan condition in heat pump equipment. The presently preferred embodiment employs a microprocessor-based control system with a complement of sensors and an electronically controlled expansion valve to optimally control the flow of refrigerant through the system. To illustrate the principles of the invention, a heat pump system, capable of providing both heating and cooling, will be described. A heat pump system of this type might be suitable for heating and cooling a commercial or residential building, although the principles of the invention are not limited to commercial and residential heating and cooling applications, but are applicable to virtually all pumped heat transfer systems.

Figure 1:
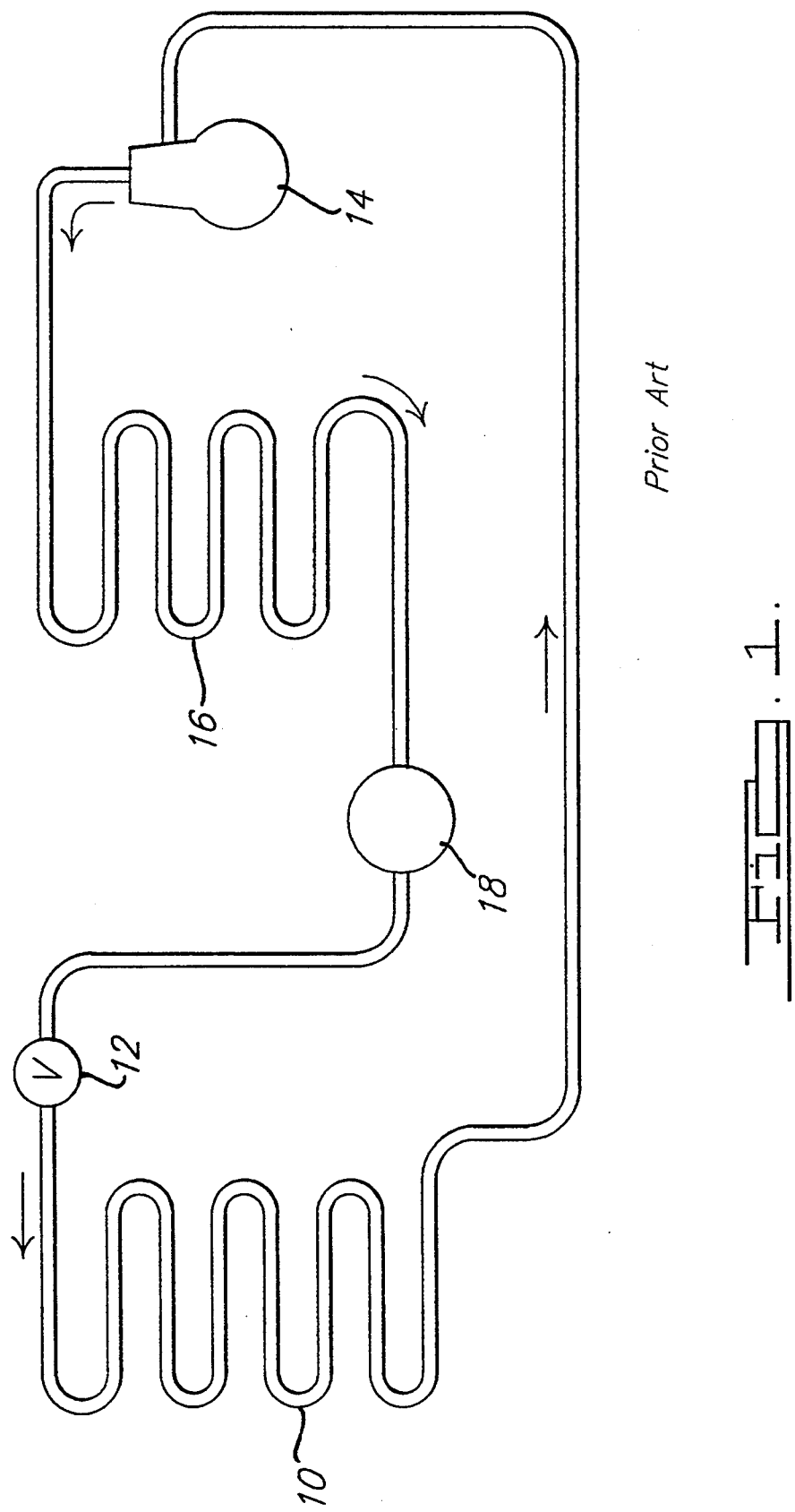
FIG. 1 is a simplified block diagram illustrating the basic components of a heat pump system.

Before giving a detailed description of the presently preferred embodiment, a brief review of the refrigeration cycle may be helpful. That cycle will be described in connection with a basic heat pump system illustrated schematically in FIG. 1.

The heat pump cycle uses the cooling effect of evaporation to lower the temperature of the surroundings near one heat exchanger (the evaporator) and it uses the heating effect of high pressure, high temperature gas to raise the temperature of the surroundings near another heat exchanger (the condenser). This is accomplished by releasing a refrigerant under pressure (usually in the liquid phase) into a low pressure region to cause the refrigerant to expand into a low temperature mixture of gas and liquid. Commonly, this low pressure region comprises an evaporator coil, such as evaporator coil 10. The refrigerant mixture, once in the, evaporator coil 10, is exposed to the high temperature ambient air of the region to be cooled. Evaporation of refrigerant from liquid to gas absorbs heat from the ambient air and thereby cools it.

Release of refrigerant into the low pressure evaporator coil is usually metered by a restricted orifice or valve, commonly called an expansion valve 12. There are a wide variety of different types of expansion devices in use today, ranging from simple nonadjustable capillary tubes, to electrically adjustable valves such as pulse width modulated valves. The refrigerant at the outlet of the evaporator coil is compressed back into a high pressure state by compressor 14 and condensed into a liquid phase by condenser 16 so that it may be used once again. If desired, a sump 18 may be included, as illustrated. In a heat pump application, where the system is operating in the heating mode, the condensing of high pressure gas into a liquid phase supplies heat to the surroundings.

Having reviewed the basic principles of the refrigeration or heat pump cycle, a presently preferred embodiment of the invention will be described. Although the invention can take many forms, it will be described in conjunction with FIG. 2 where a heat pump system is depicted generally at 20. The system includes an indoor unit 22, a room unit or thermostat unit 23 and an outdoor unit 24. The indoor unit includes an indoor coil or heat exchanger 26 and an indoor fan 28. The indoor fan may be driven by a variable speed motor 30. The indoor fan and indoor coil are situated using suitable duct work, so that the fan forces ambient indoor across the indoor coil at a rate determined by the speed of the fan motor.

The outdoor unit includes an outdoor coil or heat exchanger 32 and an outdoor fan 34 driven by suitable motor 36. Preferably, the outdoor unit includes a protective housing which encases the outdoor coil and outdoor fan, so that the outdoor fan will draw ambient outdoor air across the outdoor coil to improve heat transfer. The outdoor unit may also typically house a compressor 38.

Figure 2:
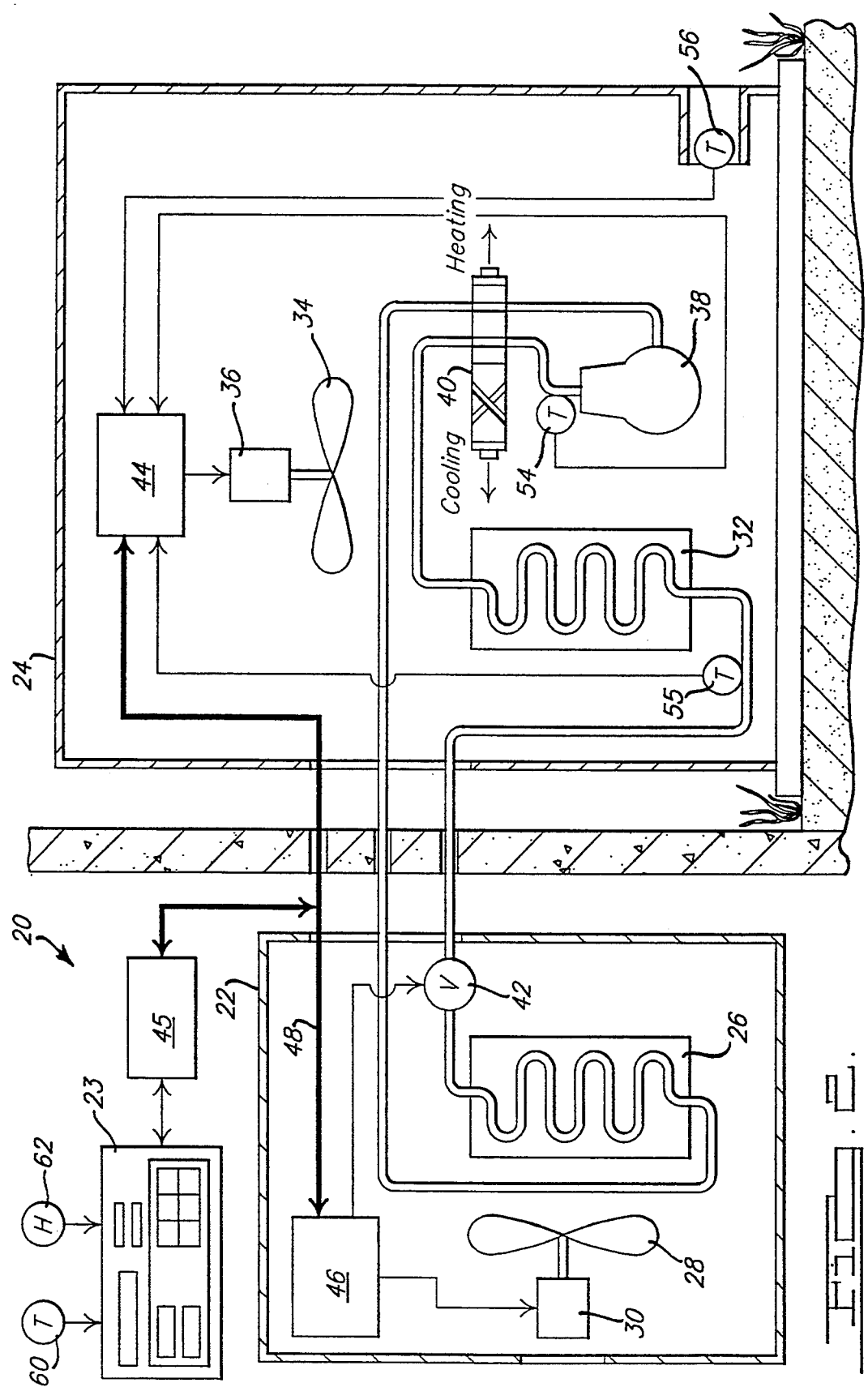
FIG. 2 is a more detailed view of the heat pump system in which thee detection mechanism of the invention may be integrated.

The system illustrated in FIG. 2 is a so-called "heat pump" system because it can be used for both cooling and heating, by simply reversing the function of the indoor coil and the outdoor coil. In the cooling mode, the outdoor coil functions as the condenser, while in the heating mode, the outdoor coil functions as the evaporator. Switching between the cooling mode and the heating mode is done using a four-way reversing valve 40. Referring to FIG. 2, when the four-way valve is switched to the cooling position (shown), the indoor coil functions as the condenser and the outdoor coil functions as the evaporator. When the four-way valve is set to the heating position (the alternate position), the functions of the coils are reversed.

The presently preferred embodiment uses an electronically controllable expansion valve (EXV) 42. In the presently preferred embodiment the expansion valve is a continuously variable (or incrementally variable) stepper motor valve which can be adjusted electronically to a wide range or orifice sizes or valve openings, ranging from fully open to fully closed. Although it is possible to implement the control system of the invention with other types of electrically controlled valves, pulse width modulated valves being an example, the stepper motor valve is presently preferred because it provides ripple-free operation and because it is more trouble-free. The stepper motor valve only needs to move or "cycle" when an orifice size adjustment is made. This may happen several times during a typical operating sequence (e.g., several times per hour). In contrast, the pulse width modulated valve cycles continuously at high frequency during the entire operating sequence.

The presently preferred system is a microprocessor-based system which gathers data from various sensors and which, among other things, determines the proper setting of the expansion valve based on the data gathered. This same microprocessor-based system is also used to perform the airflow obstruction and blocked fan detection processes of the invention, as will be more fully described below. More specifically, the presently preferred embodiment uses three interconnected microprocessor-based control units 44, 45 and 46, associated with the outdoor unit 24, indoor unit 22 and room unit or thermostat unit 23, respectively. Preferably all three microprocessor-based control units are linked together via a suitable communication link 48, such as a parallel or serial communication link. The outdoor control unit 44, is, in part, responsible for data collection, while the indoor control unit 46 is responsible for: on/off cycling of the system, modulating the indoor fan speed, control of the expansion valve, start/termination of demand defrost cycle, system diagnostics and performing the blocked fan and airflow obstruction detection processes of the invention.

The microprocessor-based system employs a plurality of sensors for measuring temperature at various locations throughout the system. Specifically, the present invention has a first temperature sensor 54, which measures the discharge temperature of the refrigerant as it exits the compressor 38. A second temperature sensor 55 measures the temperature of the outdoor heat exchanger 32 and a third temperature sensor 56 measures the temperature of the ambient air that is drawn into heat exchange contact with the outdoor heat exchanger by action of fan 34. Preferably temperature sensor 56 is situated in an inset region of the outdoor unit housing, so that it will be shaded from direct sunlight and yet will be situated in the airflow path of the air which makes heat exchange contact with the outdoor heat exchanger 32. In addition to these sensors, the system may also employ a fourth temperature sensor 60 which may be integrated into the room unit or thermostat unit 23. If desired, a humidity sensor 62 may also be incorporated in the room unit 23.

As the system operates its i s expected that a certain amount of frost will begin to build up on the heat exchanger which is functioning as the evaporator. In a heat pump application, in heating mode, the outdoor coil functions as the evaporator. Thus, in heating mode the evaporator coil will gradually build up an accumulation of frost. Conversely, in the cooling mode the indoor coil will gradually build up an accumulation of frost. In either case, this buildup of frost degrades system performance by obstructing optimal heat transfer. The present embodiment employs a demand defrost system which is designed to periodically melt this accumulated frost. Essentially, when a frost buildup is detected (as discussed below), four-way reversing valve 40 is cycled to its opposite position, temporarily reversing the functions of the indoor and outdoor coils. This causes heat to be pumped to the frosted coil, melting the frost.

Figure 3:
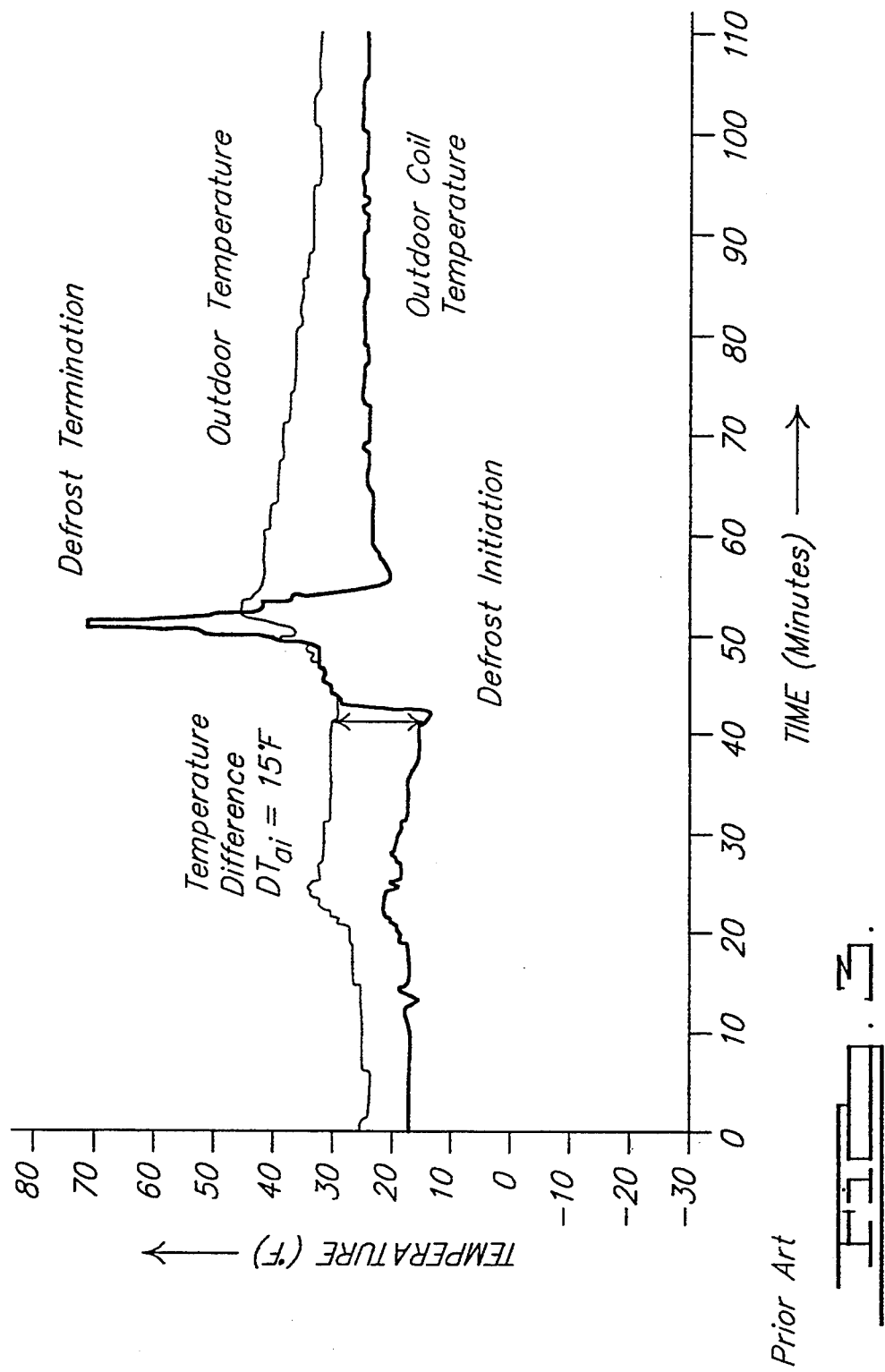
FIG. 3 is a graph depicting outdoor coil temperature and outdoor air temperature profile as a function of time, for a normal defrosting of the outdoor coil with a blockage.

Referring to FIG. 3 there is depicted a graph comparing the outdoor air temperature and the outdoor coil temperature prior to, during and after a normal demand defrost cycle. The data is typical of what might be encountered in a heat pump heating mode application at an outdoor air temperature in the range of about 20° F. to 30° F. In the example of FIG. 3, note the temperature difference $DT_{ai}$ between the outdoor air temperature and the outdoor coil temperature at defrost initiation is about 15° F. Shortly after initiation of the defrost cycle the outdoor coil temperature rises to a peak nominally about 70° F. whereupon the defrost cycle is terminated, as indicated in FIG. 3. In actual practice, the outdoor air temperature data, as measured by the outdoor air temperature sensor 56, is somewhat coupled to or affected by the outdoor coil temperature. This results in a slight rise in the measured outdoor air temperature near the end of each defrost cycle. In actuality, the outdoor air temperature is likely to be relatively constant and this slight rise in temperature is due to the dissipation of residual heat i! n the outdoor coil and associated thermally connected components following each defrost cycle. After this residual heat is dissipated the measured outdoor air temperature settles back down to the ambient air temperature reading as illustrated in FIG. 3. Note that the temperature difference $DT_{ai}$ during periods between defrost cycles appears relatively constant within a range of about 10° to 15° in this example at the nominal outdoor air temperature of 29° F. This represents a-normal performance characteristic, in which the airflow passages and outdoor fan are free from obstruction or blockages.

Figure 4:
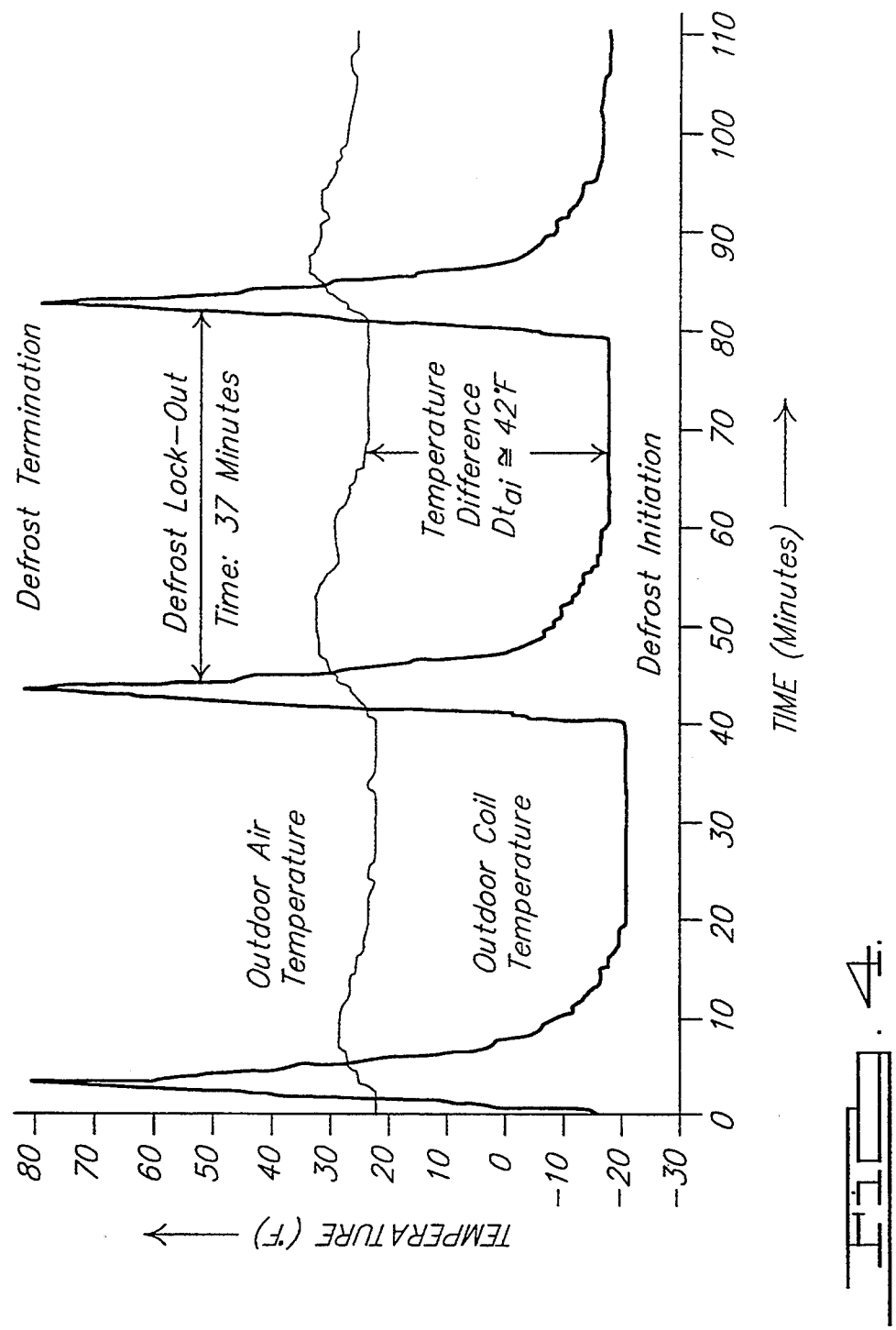
FIG. 4 is a similar graph depicting outdoor air temperature and outdoor coil temperature as a function of time for the case where a blockage condition exists.

When the airflow passages or outdoor fan become obstructed or blocked we have found that the relationship between outdoor air temperature and outdoor coil temperature behaves quite differently. As illustrated in FIG. 4, under a blocked outdoor fan condition at an outdoor air temperature of about 22° F. there is a large temperature difference $DT_{ai}$ (in this example the difference is about 42° F.) before and after each defrost cycle has terminated and the outdoor air temperature reading has stabilized back to the ambient air temperature. This large temperature difference may be attributed to an airflow blockage or fan blockage which degrades the outdoor coil temperature's ability to efficiently transfer heat. In addition to this large temperature difference, it will be noted that the temperature difference does not decrease even after termination of the defrosting cycle. In the normal condition illustrated in FIG. 3, the defrosting operation melts the frost and thereby decreases the temperature difference.

The present invention implements a computer control process which, in the heating mode, monitors the temperature difference, $DT_{ai}$ between the outdoor air temperature and the outdoor coil temperature. The preprogrammed logic identifies the simultaneous incidence of an abnormally high $DT_{ai}$ together with a failure to decrease the $DT_{ia}$ after termination of a defrost cycle. As will be more fully described, the presently preferred embodiment integrates this blocked fan or restricted airflow detection system with the existing demand defrost system.

Figure 5:
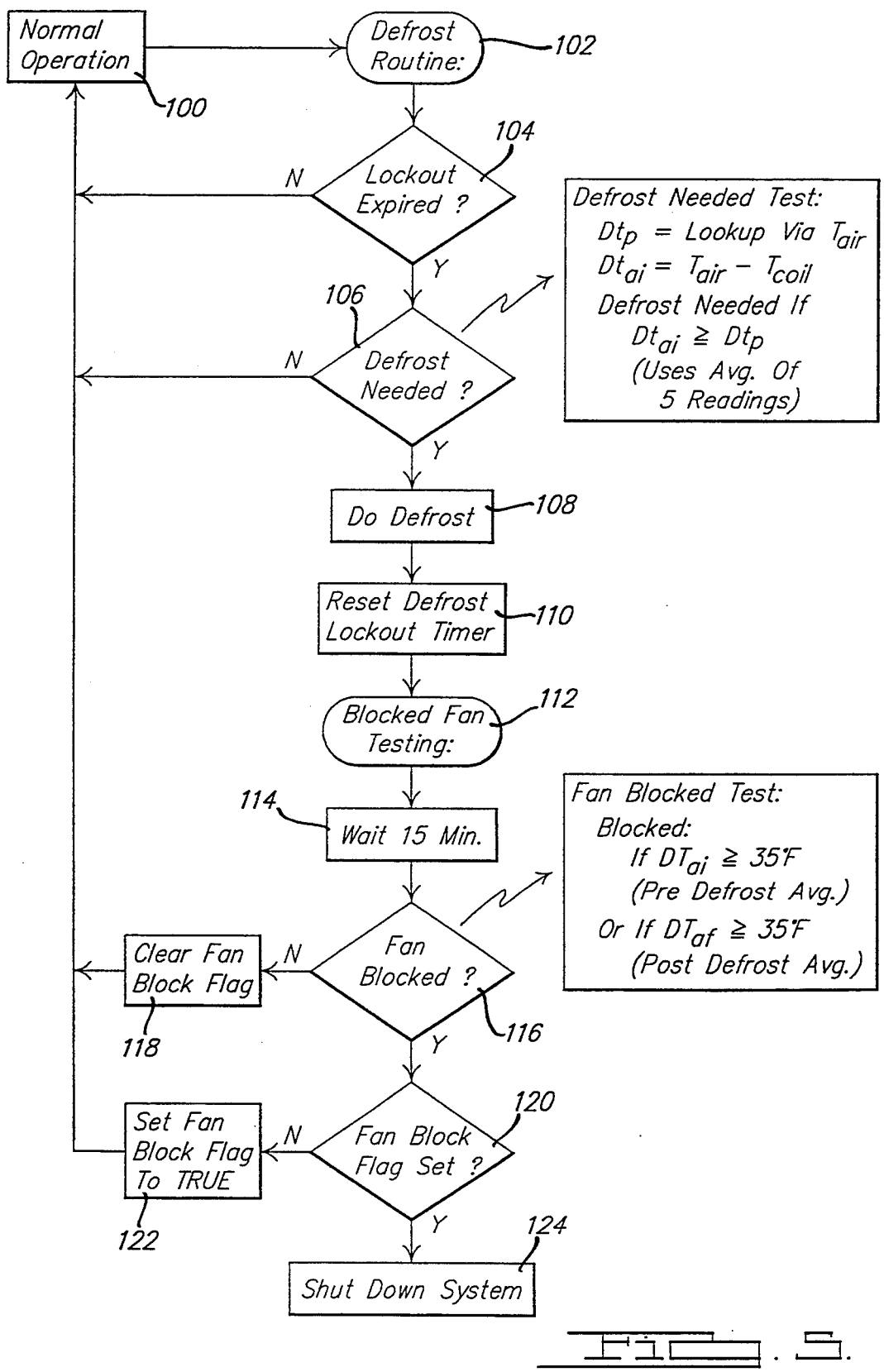
FIG. 5 is an overview flowchart showing basic components of the presently preferred blockage detection mechanism.
Figure 5A:
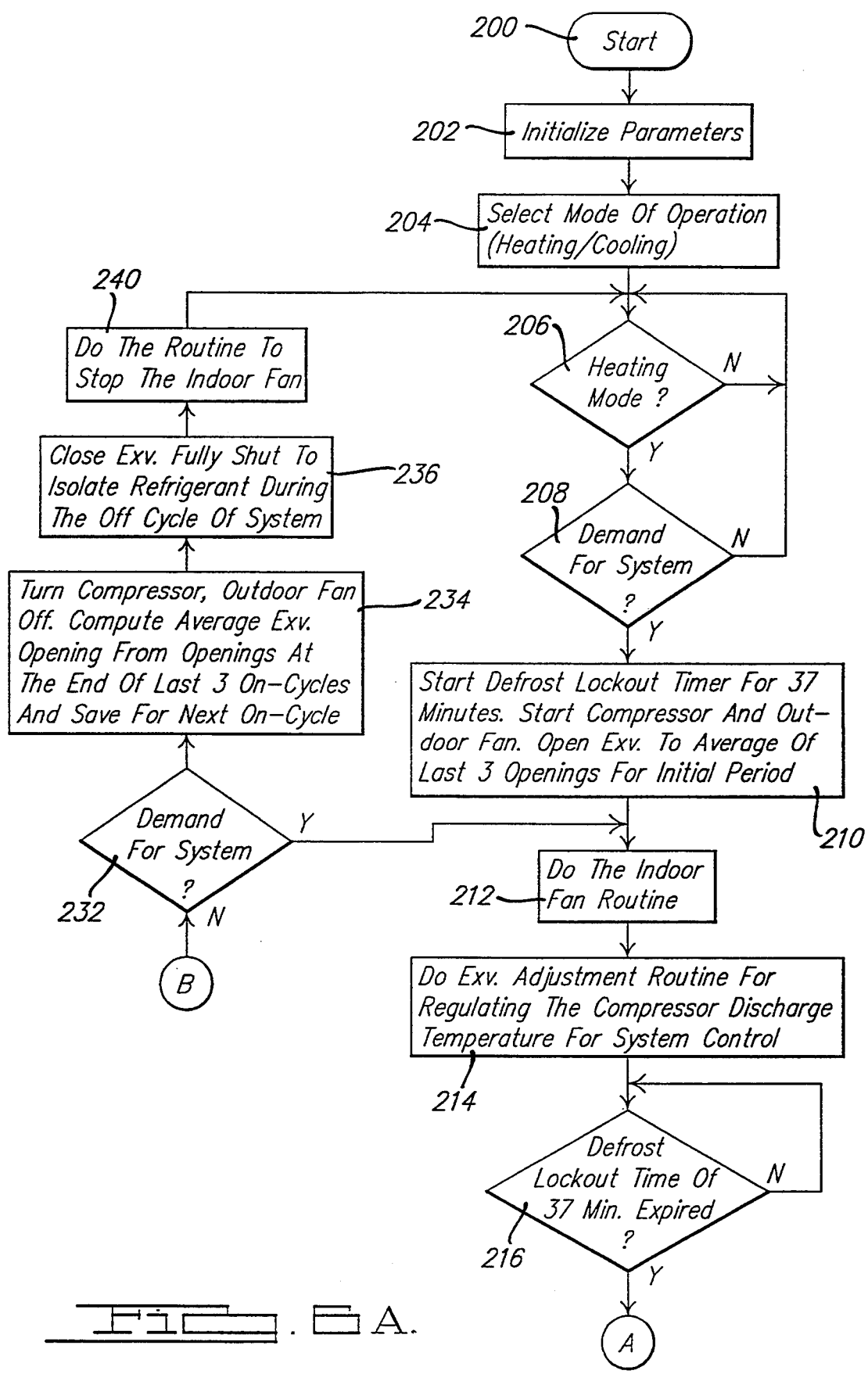
Figure 8B:
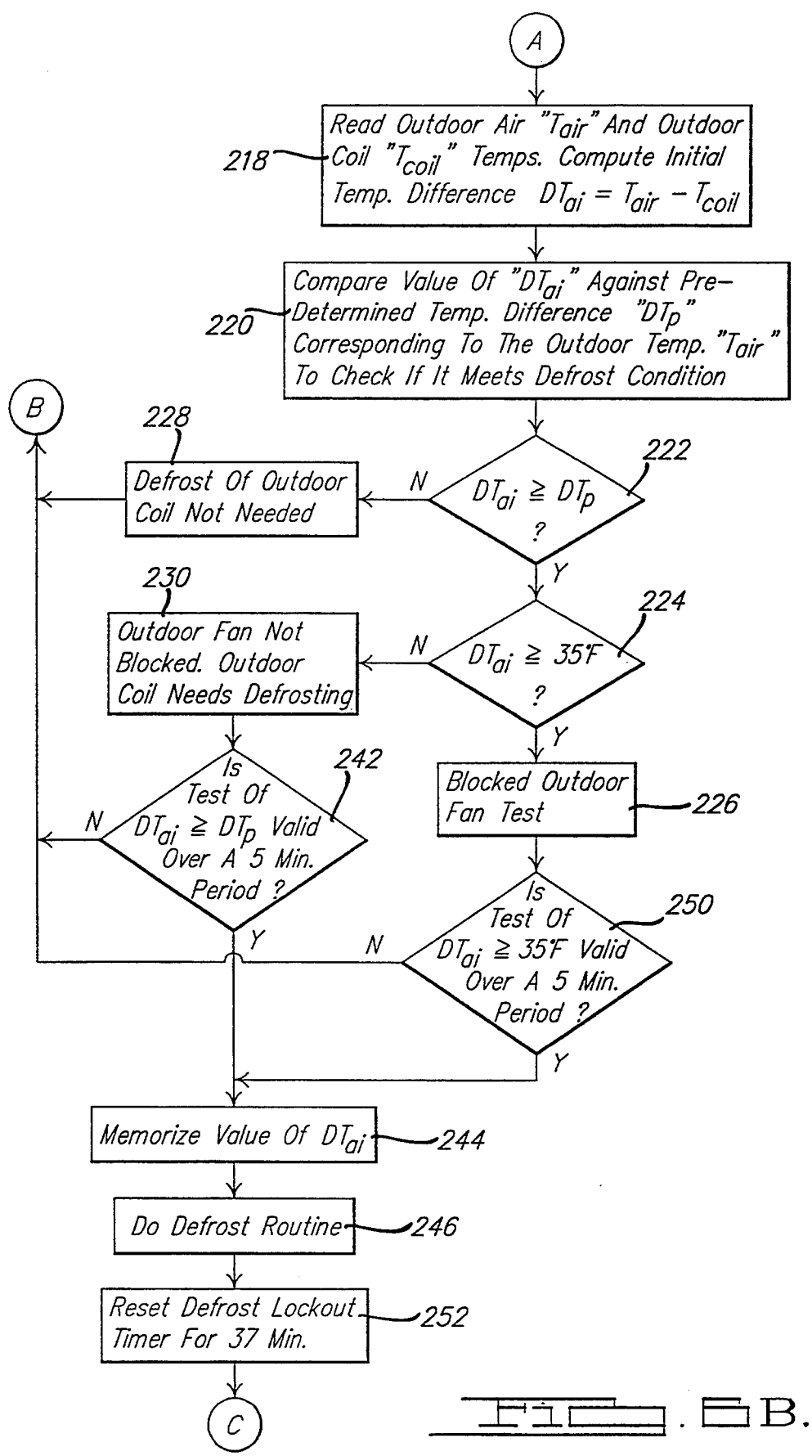
Figure 5C:
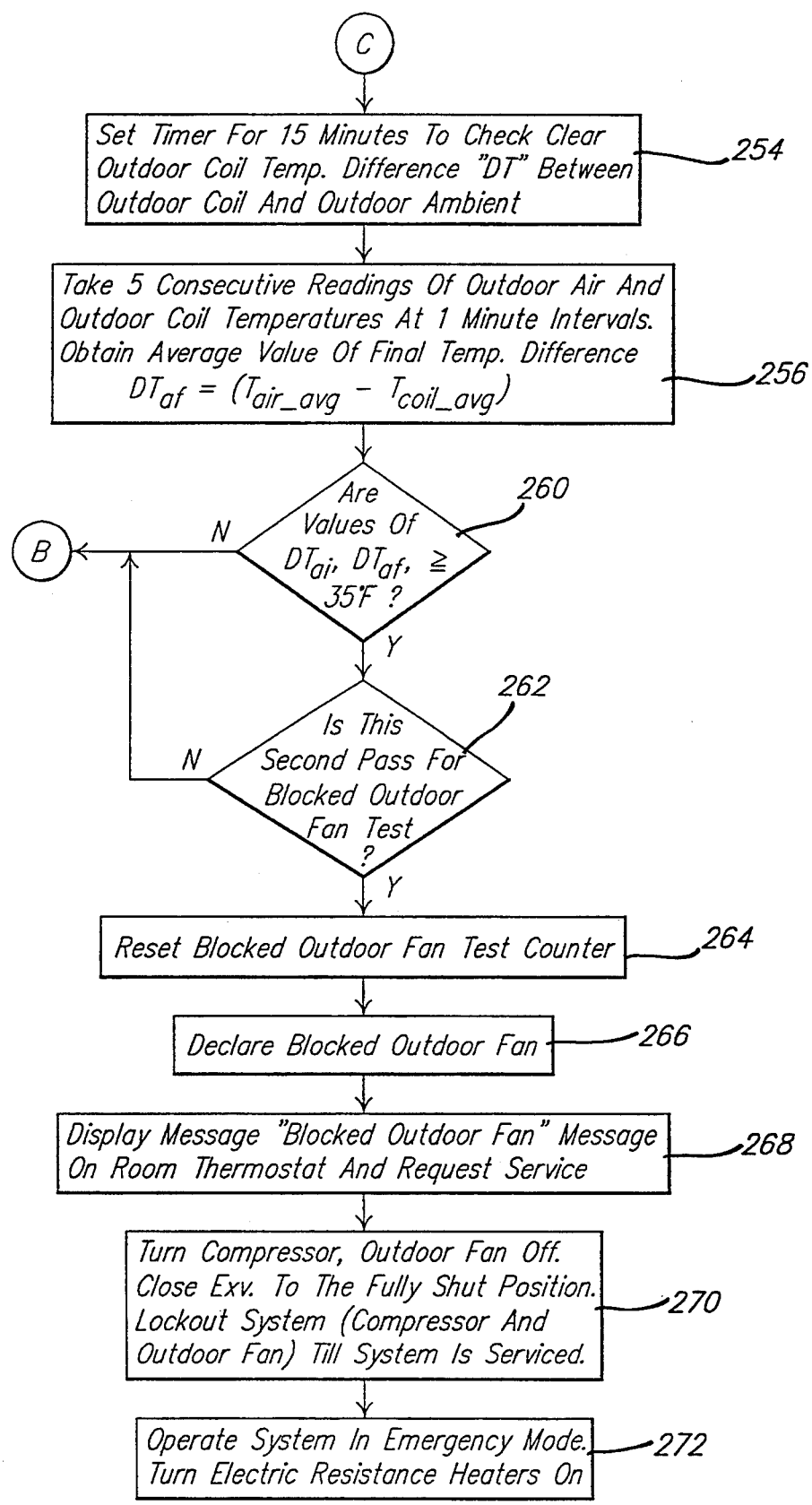

Referring to FIG. 5, an overview of the basic components of the presently preferred blockage detection system is illustrated. In FIG. 5 the normal system operation is depicted by block 100. This block would include the appropriate control routines for operating the electronically controllable expansion valve 42. As part of the normal operation, the control system will periodically perform a defrost routine depicted as originating in block 102. The specific steps of the defrost routine are depicted by blocks 104–110, inclusive. The presently preferred embodiment performs demand defrost, i.e. the defrost routine is performed only as needed. To prevent overutilization of the defrost routine the system employs a defrost lockout timer which ensures that at least 37 minutes will elapse between defrost operations. Accordingly, at step 104 the lockout timer is interrogated to see if the 37 minute time has elapsed. If not, control branches back to the normal operation block 100. If the lockout time has expired control proceeds to step 106 where a test is performed to see if a defrost operation is needed. This test is performed by obtaining a reading of the ambient air temperature Tair using sensor 56. The value so obtained is then used to obtain a standard temperature difference $D_{tp}$ using a lookup table or straight line equation calculation based on the data depicted in FIG. 7. FIG. 7 illustrates graphically the standard temperature difference $D_{tp}$ for a given outdoor air temperature $T_{air}$. In this regard, the data illustrated are exemplary values for a typical embodiment. Preferably, these data are preprogrammed at the factory during manufacture, based on the operating requirements of the system. In essence, the standard temperature difference $D_{tp}$ may be readily determined by the manufacturer as the temperature difference for which the manufacturer prefers to initiate a demand defrost cycle. The presently preferred data represent a straight line described by the equation $D_{tp} = 0.0909\ T_{air} + 12.91$.

Once the standard temperature difference value is arrived at by lookup table or calculation, a measured temperature difference is obtained by subtracting the outdoor coil temperature from the outdoor air temperature to arrive at a measured temperature difference $DT_{ai}$. This value corresponds to the temperature difference depicted in FIGS. 3 and 4 described above. In the presently preferred embodiment the system uses the numerical average of five minutes of $DT_{ai}$. If the average $DT_{ai}$ is greater than or equal to the standard temperature difference value $D_{tp}$, then a defrost operation is required and control branches to step 108 where the defrost cycle is commenced, reversing flow through the reversing valve 40, and then terminated, returning flow for normal operation. Conversely, i f defrost i s not required, control branches back to normal operation block 100. Following the termination of a defrost cycle in step 108, the defrost lockout timer is reset at step 110. In a system without the blocked fan or airflow restriction detection system of the invention, control would normally then return to normal operation block 100. However, the present invention provides an airflow detection or blocked fan routine which commences at step 112 and includes steps 114 through 124, inclusive. As used herein, the "blocked fan" nomenclature is intended to cover airflow restrictions and blocked or stalled fan conditions which prevent or degrade heat transfer between the coil and the surrounding air and which cannot be cleared by melting as in the case of frost.

The blocked fan routine begins by waiting for a sufficient time to allow temperatures to stabilize after the defrost cycle is completed. Accordingly, the preferred embodiment at step 114 waits 15 minutes before proceeding. Next, the blocked fan routine is performed as follows. If the average temperature difference $DT_{ai}$ (the average reading obtained in step 106) is greater than on equal to a predetermined large number (e.g. 35° F.), then a potential blocked fan condition exists. In addition to testing the predefrost average temperature difference, the system takes another series of readings to obtain a post-defrost average $DT_{af}$. The post-defrost average is obtained by subtracting the outdoor coil temperature from the outdoor air temperature over five consecutive readings and computing the numerical average (essentially the same way the predefrost average $DT_{ai}$ was computed). If this post-defrost average $DT_{af}$ is greater than or equal to the predetermined large number (e.g. 35° F.), this too, signifies a potential blocked fan condition. The presently preferred embodiment requires the potential blocked fan condition to be found in two successive cycles of the blocked fan test before the system is mandatorily shut down for servicing. One way of accomplishing this is illustrated in FIG. 5. In FIG. 5 a Fan Block flag is set when a potential blocked fan condition exists. Accordingly, if the fan blocked test at step 116 finds a blocked fan condition to exist, control will branch to step 120 where the Fan Block flag is tested. If the flag was set during a preceding cycle, then control branches to step 124 where the system is shut down. Conversely, if the flag was not previously set, then step 122 is performed which sets the Fan Block flag to TRUE. Thereafter, control resumes with the normal operation block 100. On the other hand, if the fan blocked test at step 116 does not find a blocked fan condition to exist, then control branches to step 118 where the Fan Block flag is cleared. Thereafter, control returns to the normal operation block 100.

By tracing the logic of steps 116-124, inclusive, it will be seen that the blocked fan condition must be found to exist on two successive blocked fan testing cycles in order for the system to shut down at step 124. If a blocked fan condition is found during a first pass but is not found during the next pass, step 118 ensures that thee system will remain operating, by clearing the Fan Block flag.

With the foregoing overview in mind, a detailed description of the presently preferred blocked fan detection system will be presented with reference to FIGS. 6A-6C. FIG. 6A begins, at step 200, by illustrating a portion of the normal operation steps (found in normal operation block 100 of FIG. 5). After initializing parameters in step 202 the normal operation block proceeds in step 204 by selecting the mode operation, i.e., heating/cooling. Next, in step 206 the operating mode is tested and if the heating mode has been selected and if there is demand for the system (step 208), then the defrost lockout timer is started in step 210. As previously described, the presently preferred embodiment employs a 37 minute lockout timer. In addition, in step 210, the compressor 38 and outdoor fan motor 36 are started. In addition, the electronically controllable expansion valve (EXV) 42 is opened to an average of the last three settings, where it remains for a predetermined initial period.

After starting the aforementioned components, control proceeds to block 212 where the indoor fan routine is initiated. The indoor fan routine turns on the indoor fan by energizing motor 30. If a variable speed motor is employed, the indoor fan routine may be used to select the appropriate fan speed, to optimize occupant comfort and control humidity. Thereafter, in step 214, the setting of the expansion valve 42 is adjusted to the optimal setting. The presently preferred embodiment performs the expansion valve adjustment using the compressor discharge temperature derived from sensor 54. Once the defrost lockout time expires, as determined at step 216, control proceeds to step 218 where the defrost routine is commenced. For comparison purposes, step 216 corresponds generally to step 104 of FIG. 5.

In step 218 the outdoor air temperature and outdoor coil temperature are read via sensors 56 and 55, respectively. The readings are used to compute an initial temperature difference which is then compared in step 220 to a predetermined temperature difference $DT_p$, which may be obtained using the above-described straight line calculation or by access to a lookup table containing data corresponding to FIG. 7. If the computed value $DT_{ai}$ is greater than or equal to the predetermined temperature difference $DT_p$ step 222 ) and if the computed temperature difference is also greater than or equal to a predetermined large value such as 35° F. (step 224), then the blocked fan test is performed beginning at step 226. On the other hand, if the computed temperature difference is not greater than or equal to the predetermined temperature difference, then defrosting of the outdoor coil is not needed and control takes the branch at step 228. If the computed initial temperature difference is greater than or equal to the predetermined temperature difference but not greater than or equal to the predetermined large value (35° F.), then the outdoor fan is not blocked, but defrosting may be required. In this case control branches to step 230.

In the case where defrost of the outdoor coil is not needed (step 228), control proceeds to step 232. If there is no demand for the system at this point, the compressor and outdoor fan are turned off in step 234 and the average expansion valve opening is computed, using the openings at the end of the last three ON cycles. This value is saved for use during the initial period of the next ON.cycle (at step 210). Thereafter, the expansion valve is closed fully shut to isolate refrigerant during the OFF cycle (step 236). Finally, a routine is performed to shut down the indoor fan (step 240), whereupon control returns to the entry point of step 206.

In the case where a blocked fan condition is not found, but where the coil needs defrosting (step 230) control proceeds to step 242 where the comparison between the computed initial temperature difference $DT_{ai}$ and the predetermined temperature difference $DT_p$ is repeatedly tested over a 5 minute period. This is done to screen out spurious readings. If $DT_{ai}$ is greater than or equal to $DT_p$ over the 5 minute interval, then the value $DT_{ai}$ is stored at step 244 and the defrost routine is then commenced beginning at step 246.

The blocked outdoor fan test, commencing at step 226, similarly tests over a 5 minute interval at step 250 to determine whether $DT_{ai}$ is greater than or equal to a predetermined large number, such as 35° F. If so, then the value $DT_{ai}$ is stored at step 244, whereupon the defrost routine is commenced at step 246.

The defrost routine proceeds by resetting the defrost lockout timer to 37 minutes at step 252. Then an additional timer is set at step 254, preferably on the order of 15 minutes, which is used as a time delay to allow temperatures to stabilize after defrost termination. Next, in step 256 five consecutive readings of the outdoor air temperature and outdoor coil temperature are taken at 1 minute intervals to obtain an average value $DT_{af}$, representing a final temperature difference. That is, $DT_{af}=-(T_{air-avg}-T_{coil-avg})$.

If either the average final temperature difference value $DT_{af}$ or the initial temperature difference value $DT_{ai}$ are greater than or equal to 35° as determined in step 260, then control proceeds to step 262 which tests a flag to determine whether this is the second pads for a blocked outdoor fan test. If so, the blocked outdoor fan test counter is reset at step 264, a blocked outdoor fan condition is declared at step 266 and a message is displayed to the building occupants (preferably on the room thermostat) at step 268. When this has been accomplished, the compressor and outdoor fan are turned off, the expansion valve is set to the fully shut position; and the system is locked out until it is serviced. This is depicted at step 270. When this condition has occurred the system operates in an emergency mode at step 272. In the emergency mode the auxiliary electric resistance heaters are turned on, inasmuch as the heat pump system has been shut down.

From the foregoing it will be understood that the present invention provides a mechanism for diagnosing restricted airflow conditions and blocked fan conditions of the type which cannot be handled by conventional defrosting. As illustrated, the detection system can be readily incorporated into the defrost routine of the heat pump system.

While the invention has been described in its presently preferred embodiments, it will be understood that certain modifications can be made to this design without departing from the spirit of the invention as set forth in the appended claims.

What is claimed is:

1. An airflow obstruction detection method for detecting an airflow obstruction condition in an outdoor heat exchanger, comprising the steps of:

at first time, determining a first temperature difference parameter indicative of a temperature difference between the outdoor heat exchanger and the ambient air surrounding said heat exchanger;

performing a defrost cycle when the first temperature difference parameter is equal or exceeds a first predetermined value;

at a second time, determining a second temperature difference parameter indicative of a temperature difference between the outdoor heat exchanger and the ambient air surrounding said heat exchanger after the defrost cycle has been completed;

declaring an obstruction condition due to foreign matter or debris to exist if the second temperature difference parameter is equal or exceeds a second predetermined value.

2. The method of claim 1 wherein said step of determined a first temperature difference parameter comprises the steps of determining a first parameter indicative of the temperature of the outdoor heat exchanger, determining a second parameter indicative of the ambient air temperature in the vicinity of the outdoor heat exchanger, and using said first and second parameters to calculate the first temperature difference parameter.

3. The method of claim 1 wherein said step of determining a second temperature difference parameter comprises the steps of determining a first parameter indicative of the temperature of the outdoor heat exchanger, determining a second parameter indicative of the ambient air temperature in the vicinity of the outdoor heat exchanger, and using said first and second parameters to calculate the second temperature difference parameter.

4. The method of claim 1 wherein said step of performing a defrost cycle comprises the steps of determining an air temperature parameter indicative of the temperature of the ambient air surrounding said heat exchanger and using said ambient air temperature to obtain said first predetermined value.

5. The method of claim 1 further comprising implementing a lockout timer to restrain the performing of said defrost cycle.

6. The method of claim 5 wherein said lockout timer is reset in connection with said defrost cycle performing step and wherein said lockout timer prevents the subsequent defrost cycle performing step for a predetermined time determined at least in part by said reset.

7. The method of claim 1 further comprising performing a predetermined time delay between said defrost cycle performing step and said step of determining a second temperature difference parameter.

8. The method of claim 7 wherein said predetermined time delay is chosen to allow the temperature difference to stabilize following the defrost cycle.

9. The method of claim 7 wherein said predetermined time delay is about fifteen minutes.

10. The method of claim 1 further comprising shutting off the fan in response to the detected obstruction condition.

11. The method of claim 1 wherein said outdoor heat exchanger has associated with it a compressor for pumping refrigerant through said heat exchanger and wherein said method further comprises turning off the compressor in response to the detected obstruction condition.

12. The method of claim 1 wherein said outdoor heat exchanger has associated with it an expansion valve for regulating refrigerant flow through said heat exchanger and wherein said method further comprises closing the expansion valve in response to the detected obstruction condition.

* * * * *

UNITED STATES PATENT AND TRADEMARK OFFICE
CERTIFICATE OF CORRECTION

PATENT NO. : 5,440,890  
DATED : August 15, 1995  
INVENTOR(S) : Vijay Bahel; Hank Millet; Mickey Hickey; Hung Pham; Gregory P. Herroon It is certified that error appears in the above-indentified patent and that said Letters Patent is hereby corrected as shown below:

Column 1, line 40, delete ";".

Column 1, line 66, delete ";".

Column 2, line 4, "i! s" should be -- is --.

Column 2, line 6, delete "!".

Column 2, line 41, "heart" should be -- heat --.

Column 3, line 8, "thee" should be -- the --.

Column 3, line 60, delete --,--(second occurrence).

Column 4, line 23, after "indoor" insert -- air --.

Column 4, line 53, "or" should be -- of --.

Column 5, line 41, "its" should be -- it --.

Column 5, line 41, "i s" should be -- is --.

Column 6, line 11, "i! n" should be -- in --.

Column 6, line 20, "a-normal" should be -- a normal --.

Column 6, line 48, "$DT_{ia}$" should be -- $DT_{ai}$ --.

Column 7, line 6, "Tair" should be -- $T_{air}$ --.

Column 7, line 36, "i f" should be -- if --.

UNITED STATES PATENT AND TRADEMARK OFFICE
CERTIFICATE OF CORRECTION

PATENT NO. : 5,440,890
DATED : August 15, 1995
INVENTOR(S) : Vijay Bahel; Hank Millet; Mickey Hickey; Hung Pham; Gregory P. Herroon It is certified that error appears in the above-indentified patent and that said Letters Patent is hereby corrected as shown below:

Column 7, line 36, "i s" should be -- is --.

Column 7, line 58, "on" should be -- or --.

Column 8, line 28, "thee" should be -- the --.

Column 9, line 26, after "ON" delete "."

Column 9, line 59, "35°" should be -- 35°F --.

Column 10, line 23, after "at" insert -- a --.

Column 10, lines 39, 40, "determined" should be -- determining --.

Signed and Sealed this

Third Day of September, 1996

Attest:

BRUCE LEHMAN

*Attesting Officer*  *Commissioner of Patents and Trademarks*